(12) United States Patent
Wang et al.

(10) Patent No.: US 11,128,016 B2
(45) Date of Patent: Sep. 21, 2021

(54) BATTERY ASSEMBLY JOINT WITH Z-SHAPED WELD BEAD

(71) Applicant: Ford Global Technologies, LLC, Dearborn, MI (US)

(72) Inventors: Yongcai Wang, Ann Arbor, MI (US); Yunan Guo, Rochester Hills, MI (US); Guangyao Li, Ypsilanti, MI (US); Ahteram Khan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 16/121,804

(22) Filed: Sep. 5, 2018

(65) Prior Publication Data
US 2020/0075913 A1 Mar. 5, 2020

(51) Int. Cl.
| | |
|---|---|
| *H01M 50/502* | (2021.01) |
| *H01M 10/647* | (2014.01) |
| *H01M 50/20* | (2021.01) |
| *H01M 50/528* | (2021.01) |
| *H01M 50/543* | (2021.01) |
| *H01M 50/40* | (2021.01) |
| *B23K 15/00* | (2006.01) |
| *B60L 50/50* | (2019.01) |

(52) U.S. Cl.
CPC ....... *H01M 50/502* (2021.01); *B23K 15/0046* (2013.01); *B60L 50/50* (2019.02); *H01M 10/647* (2015.04); *H01M 50/20* (2021.01); *H01M 50/40* (2021.01); *H01M 50/528* (2021.01); *H01M 50/543* (2021.01); *H01M 2220/20* (2013.01)

(58) Field of Classification Search
CPC ........ H01M 2/202; H01M 2/26; H01M 2/266; H01M 2/263; H01M 2/30; H01M 10/647; H01M 10/64; H01M 2220/20; H01M 50/20; H01M 50/40; H01M 50/502; H01M 50/528; H01M 50/543; B23K 15/0046; Y10T 403/477; B60L 50/50
See application file for complete search history.

(56) References Cited

U.S. PATENT DOCUMENTS

| | | | |
|---|---|---|---|
| 9,375,804 | B2 | 6/2016 | Lev |
| 9,692,031 | B2 | 6/2017 | Subramanian et al. |
| 9,853,277 | B2 | 12/2017 | Benedict et al. |

(Continued)

FOREIGN PATENT DOCUMENTS

| | | |
|---|---|---|
| CN | 205723728 U | 11/2016 |
| WO | 2016157268 A1 | 10/2016 |
| WO | 2014178130 A1 | 2/2017 |

OTHER PUBLICATIONS

Khan, Ali. "Micro-Joining of Energy Storage Devices," Laser Open Day—TWI Ltd. Jul. 19, 2016.

(Continued)

*Primary Examiner* — Mayla Gonzalez Ramos
(74) *Attorney, Agent, or Firm* — David B. Kelley; Carlson, Gaskey & Olds, P.C.

(57) ABSTRACT

This disclosure relates to a battery assembly for an electrified vehicle and a corresponding method. An exemplary battery assembly includes a battery cell including a terminal, a busbar, and at least one first weld bead securing the busbar to the terminal. The at least one first weld bead is substantially Z-shaped.

13 Claims, 5 Drawing Sheets

(56) References Cited

U.S. PATENT DOCUMENTS

| | | |
|---|---|---|
| 9,917,291 B2 | 3/2018 | Tyler et al. |
| 2008/0296271 A1 | 12/2008 | Klein et al. |
| 2010/0248010 A1* | 9/2010 | Butt .................. H01H 85/0241 |
| | | 429/160 |
| 2012/0088132 A1* | 4/2012 | Ahn .................. H01M 10/6551 |
| | | 429/83 |
| 2012/0149258 A1* | 6/2012 | Tartaglia ............... B23K 11/115 |
| | | 439/890 |
| 2015/0221921 A1* | 8/2015 | Choi ...................... H01M 2/30 |
| | | 429/158 |
| 2016/0280088 A1 | 9/2016 | Callicoat et al. |
| 2016/0301057 A1* | 10/2016 | Subramanian ........ H01M 2/206 |

OTHER PUBLICATIONS

Lee, Shawn S., et al. "Joining Technologies for Automotve Lithium-Ion Battery Manufacturing: A Review," Conference Paper for MSEC2010, Erie, PA, Oct. 12-15, 2010.

Das, Abhishek, et al. "Joining Technologies for Automotive Battery Systems Manufacturing," World Electric Vehicle Journal 2018, 9, 22; doi:10.3390/wevj9020022, Published Jul. 5, 2018.

De Bono, Paola, "Laser Welding Research Improves Quality of Aluminium—Copper Joints; Case Study," downloaded from https://www.twi-global.com/news-events/case-studies/laser-welding-research-improves-quality-of-aluminiumcopper-joints-617/ Jul. 16, 2018.

* cited by examiner

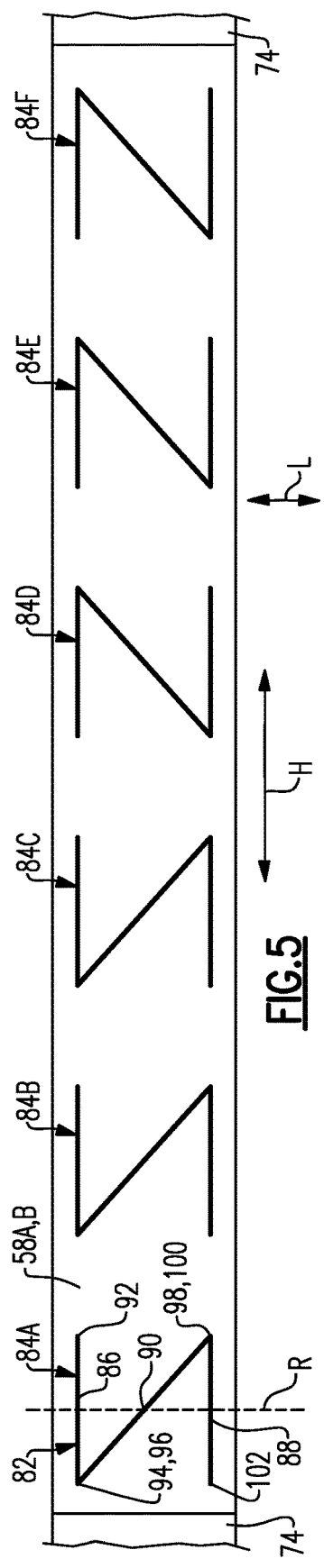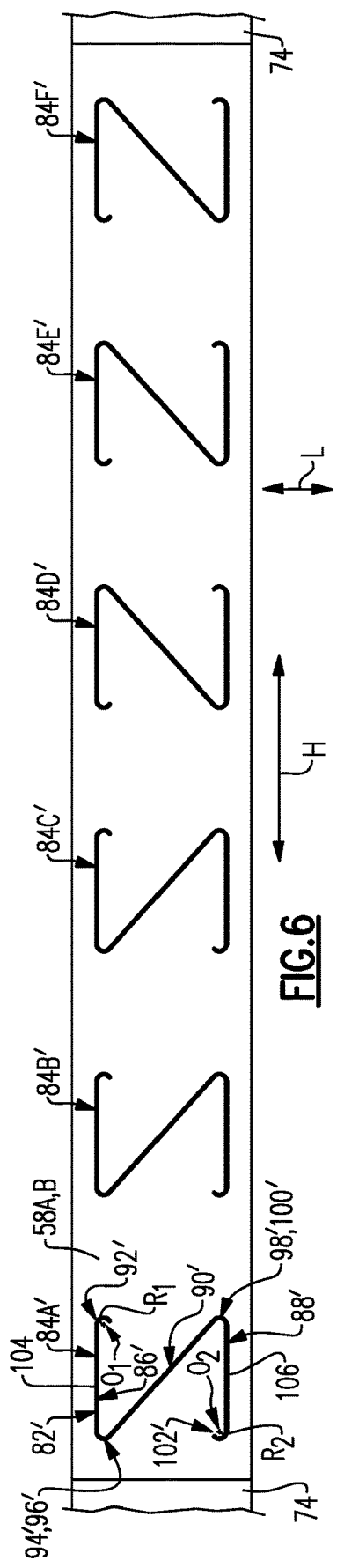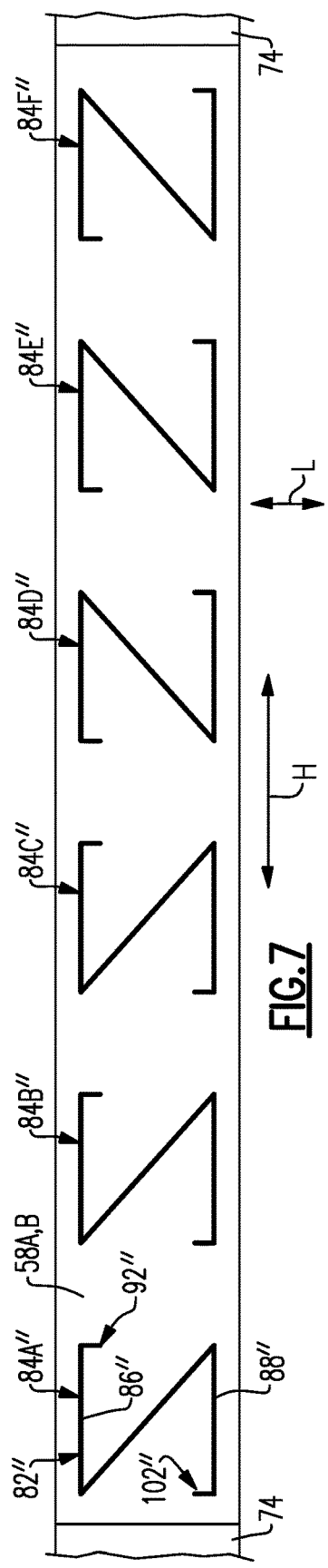

BATTERY ASSEMBLY JOINT WITH
Z-SHAPED WELD BEAD

TECHNICAL FIELD

This disclosure relates to a battery assembly for an electrified vehicle and a corresponding method. An exemplary battery assembly includes a battery cell terminal/busbar joint with one or more Z-shaped weld beads.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on an internal combustion engine to propel the vehicle.

A high voltage battery pack typically powers the electric machines and other electrical loads of the electrified vehicle. The battery pack includes a plurality of battery cells that store energy. The battery cells must be reliably connected to one another in order to achieve the voltage and power levels necessary for powering these electrical loads. Busbars are commonly used to connect the battery cells.

SUMMARY

A battery assembly according to an exemplary aspect of the present disclosure includes, among other things, a battery cell with a terminal, a busbar, and at least one first weld bead securing the busbar to the terminal. The at least one first weld bead is substantially Z-shaped.

In a further non-limiting embodiment of the foregoing battery assembly, the at least one first weld bead includes a first leg and a second leg substantially parallel to one another, and the at least one first weld bead includes a diagonal leg connecting opposite ends of the first and second legs.

In a further non-limiting embodiment of either of the foregoing battery assemblies, the first leg includes a first end and a second end, the diagonal leg includes a first end and a second end, the second leg includes a first end and a second end aligned with the first end and second end of the first leg, respectively. Further, the first end of the diagonal leg is coextensive with the second end of the first leg, and the second end of the diagonal leg is coextensive with the first end of the second leg.

In a further non-limiting embodiment of either of the foregoing battery assemblies, the first end of the first leg is curved toward the second leg, and the second end of the second leg is curved toward the first leg.

In a further non-limiting embodiment of either of the foregoing battery assemblies, the first end of the first leg projects normally from the remainder of the first leg, and the second end of the second leg projects normally from the remainder of the second leg.

In a further non-limiting embodiment of either of the foregoing battery assemblies, the at least one first weld bead includes a plurality of first weld beads securing the busbar to the terminal, each of the plurality of first weld beads are spaced-apart from one another, and each of the plurality of first weld beads are substantially Z-shaped.

In a further non-limiting embodiment of either of the foregoing battery assemblies, some of the plurality of first weld beads are substantially mirror images of others of the plurality of first weld beads.

In a further non-limiting embodiment of either of the foregoing battery assemblies, the battery cell is a first battery cell and the terminal is a first terminal, the busbar is connected to a second terminal of a second battery cell with at least one second weld bead, the second weld bead is substantially Z-shaped.

In a further non-limiting embodiment of either of the foregoing battery assemblies, the at least one second weld bead includes a plurality of second weld beads securing the busbar to the second terminal, each of the plurality of second weld beads are spaced-apart from one another, and each of the plurality of second weld beads are substantially Z-shaped.

In a further non-limiting embodiment of either of the foregoing battery assemblies, the terminal is comprised of a first material and the busbar is comprised of a second, different material.

In a further non-limiting embodiment of either of the foregoing battery assemblies, the first material is copper and the second material is aluminum.

In a further non-limiting embodiment of either of the foregoing battery assemblies, the terminal is either a positive terminal or a negative terminal.

In a further non-limiting embodiment of either of the foregoing battery assemblies, the battery cell is a pouch cell.

In a further non-limiting embodiment of either of the foregoing battery assemblies, the battery cell is arranged such that the terminal projects from a lateral side of the battery assembly, and the at least one first weld bead includes a plurality of substantially Z-shaped weld beads spaced-apart from one another in a direction of a height of the battery assembly.

A method according to an exemplary aspect of the present disclosure includes, among other things, welding a busbar to a terminal of a battery cell using a weld pattern that includes at least one substantially Z-shaped weld bead.

In a further non-limiting embodiment of the foregoing method, welding the busbar to the terminal includes laser welding the busbar to the terminal.

In a further non-limiting embodiment of any of the foregoing methods, welding the at least one substantially Z-shaped weld bead includes welding a first leg and a second leg substantially parallel to one another, and further includes welding a diagonal leg connecting the opposite ends of the first and second legs.

In a further non-limiting embodiment of any of the foregoing methods, welding the at least one substantially Z-shaped weld bead includes welding the first leg such that an end thereof is curved toward the second leg, and welding the second leg such that an end thereof is curved toward the first leg.

In a further non-limiting embodiment of any of the foregoing methods, the weld pattern includes a plurality of Z-shaped weld beads spaced-apart from one another.

In a further non-limiting embodiment of any of the foregoing methods, the weld pattern includes welding some of the plurality of weld beads as substantially mirror images of others of the plurality of weld beads.

BRIEF DESCRIPTION OF THE DRAWINGS

FIG. 5 illustrates a first example weld pattern including a plurality of substantially Z-shaped weld beads.

FIG. 6 illustrates a second example weld pattern including a plurality of substantially Z-shaped weld beads.

FIG. 7 illustrates a third example weld pattern including a plurality of substantially Z-shaped weld beads.

DETAILED DESCRIPTION

This disclosure relates to a battery assembly for an electrified vehicle and a corresponding method. An exemplary battery assembly includes a battery cell including a terminal, a busbar, and at least one first weld bead securing the busbar to the terminal. The at least one first weld bead is substantially Z-shaped. In a further example, a weld pattern includes a plurality of substantially Z-shaped weld beads. The Z-shape of the weld beads provides a number of benefits, including avoiding crack propagation, reducing weld defects, reducing stress concentrations, improving connection strength, and increasing electrical conductivity. These and other benefits will be appreciated from the following description.

Figure 1:
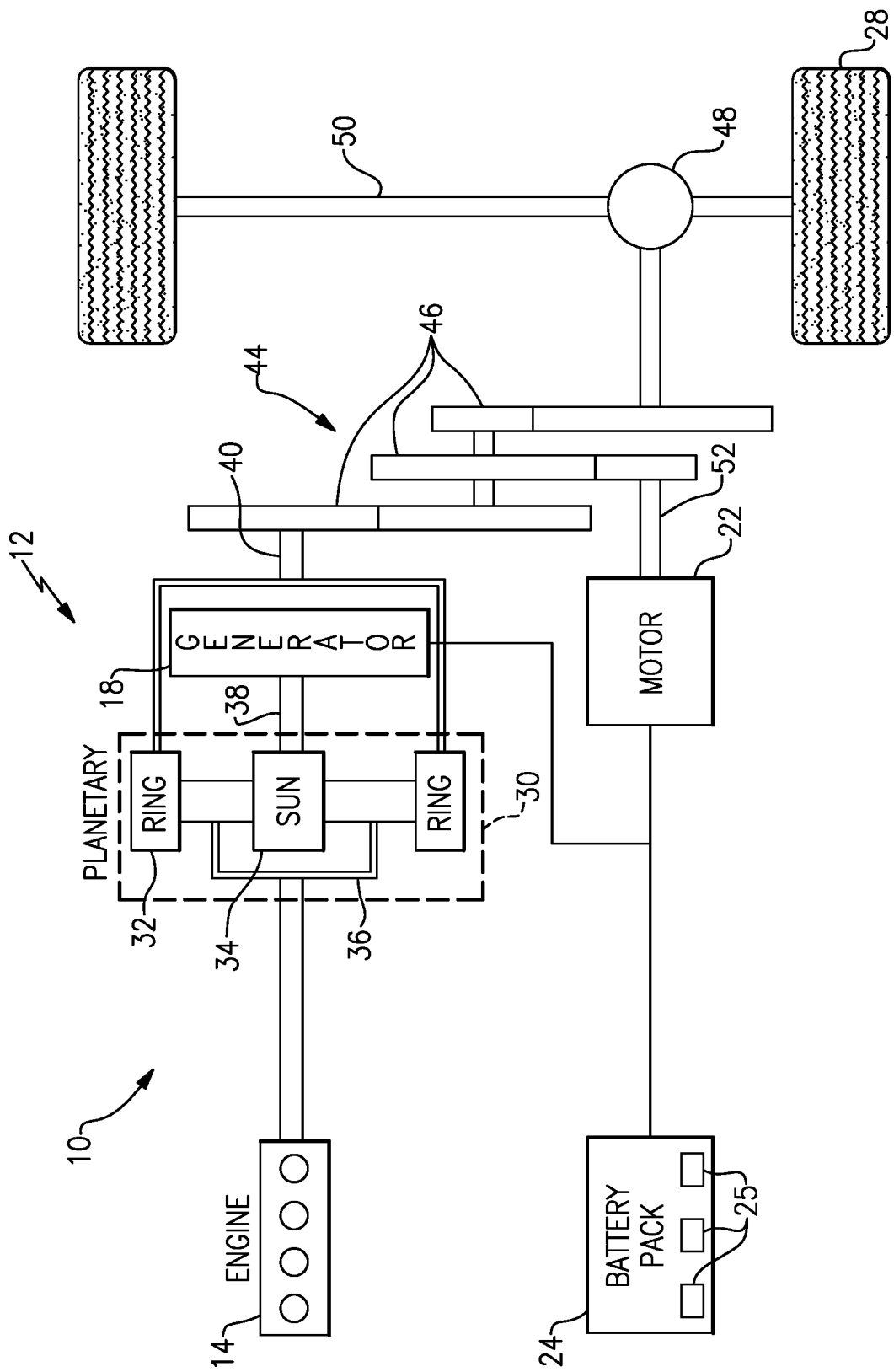
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs), battery electric vehicles (BEVs), fuel cell vehicles, etc.

In a non-limiting embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24 (or simply, "battery 24"). In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
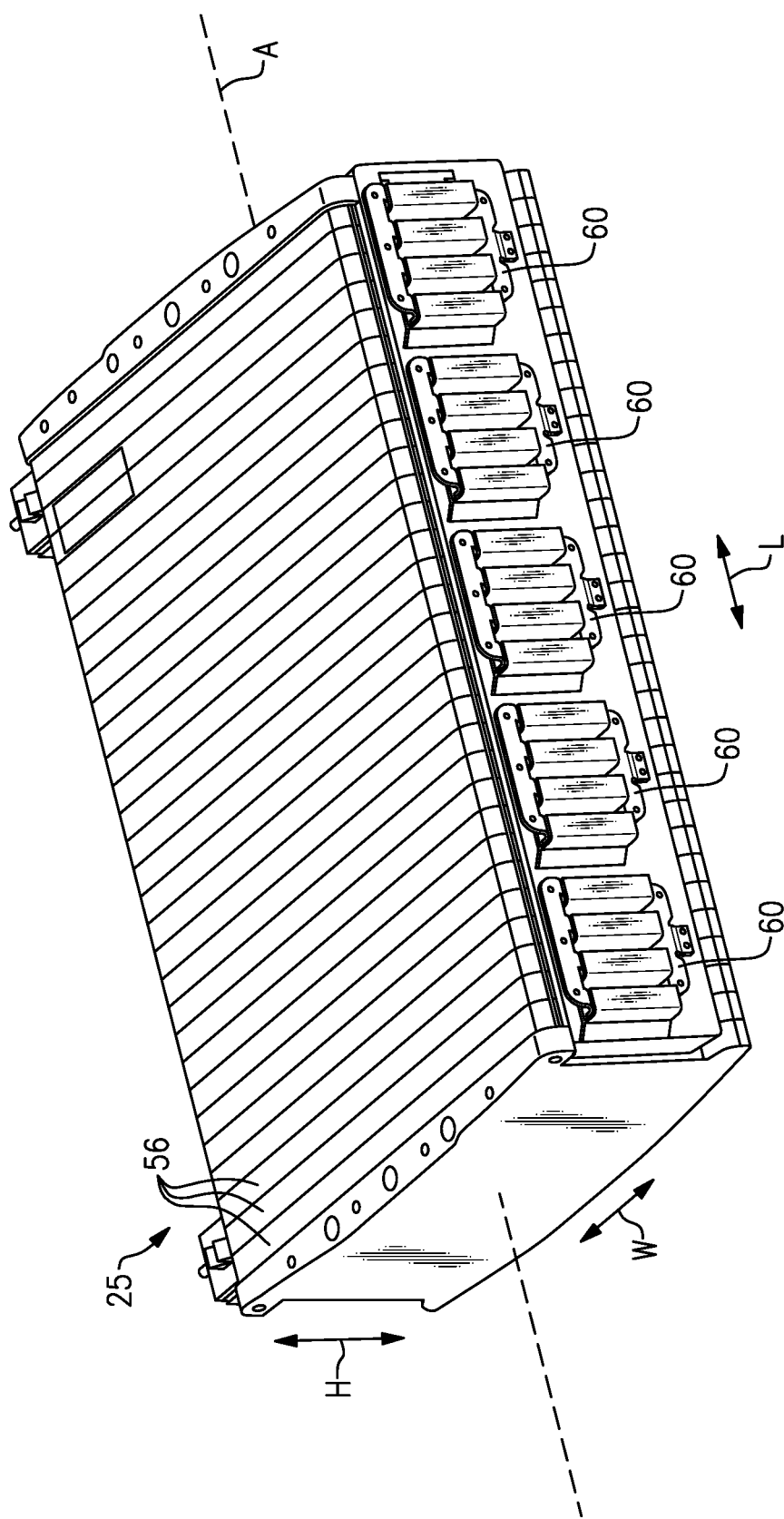
FIG. 2 illustrates a battery assembly of an electrified vehicle.

FIG. 2 illustrates a battery assembly 25 that can be employed within an electrified vehicle. For example, the battery assembly 25 could be a component of the battery pack 24 of the electrified vehicle 12 of FIG. 1. The battery assembly 25 includes a plurality of battery cells 56 that store energy for powering various electrical loads of the electrified vehicle 12. Although a specific number of battery cells 56 are depicted in FIG. 2, the battery assembly 25 could employ a greater or fewer number of cells within the scope of this disclosure. In other words, this disclosure is not limited to the specific configuration shown in FIG. 2.

The battery cells 56, along with any support structures (e.g., array frames, spacers, rails, walls, plates, bindings, etc.), may collectively be referred to as the battery assembly 25. The battery pack 24 may include one or more of the battery assemblies 25. The battery cells 56 may be stacked side-by-side along a longitudinal axis A to construct a grouping of battery cells 56, sometimes referred to as a "cell stack." Further, while the battery cells 56 are labeled in FIG. 2, FIG. 2 is only meant to illustrate an example stacked arrangement of battery cells 56 at a schematic level. The battery cells 56 may actually reside within respective external housings and, in one example, the battery cells 56 more closely resemble those shown in FIGS. 3 and 4.

In an embodiment, the battery cells 56 are pouch cells. Pouch cells employ a laminated architecture within a bag. In an example, pouch cells include conductive foil tabs welded to an electrode, which is sealed within a pouch. The tabs carry the positive and negative terminals to the outside. This disclosure is not limited to pouch cells, however. In particular, prismatic, lithium-ion cells and cells having other geometries (cylindrical, etc.) and/or other chemistries (nickel-metal hydride, lead-acid, etc.) could alternatively be utilized within the scope of this disclosure.

The battery assembly 25 generally exhibits a length L parallel to the longitudinal direction A, a height H normal to the length L, and a width W normal to the length L and height H. In this example, the battery cells 56 each include a pair of terminals (FIG. 3), and the battery cells 56 are arranged such that the terminals project from lateral sides of the battery assembly 25 for engagement with a busbar 60.

Figure 3:
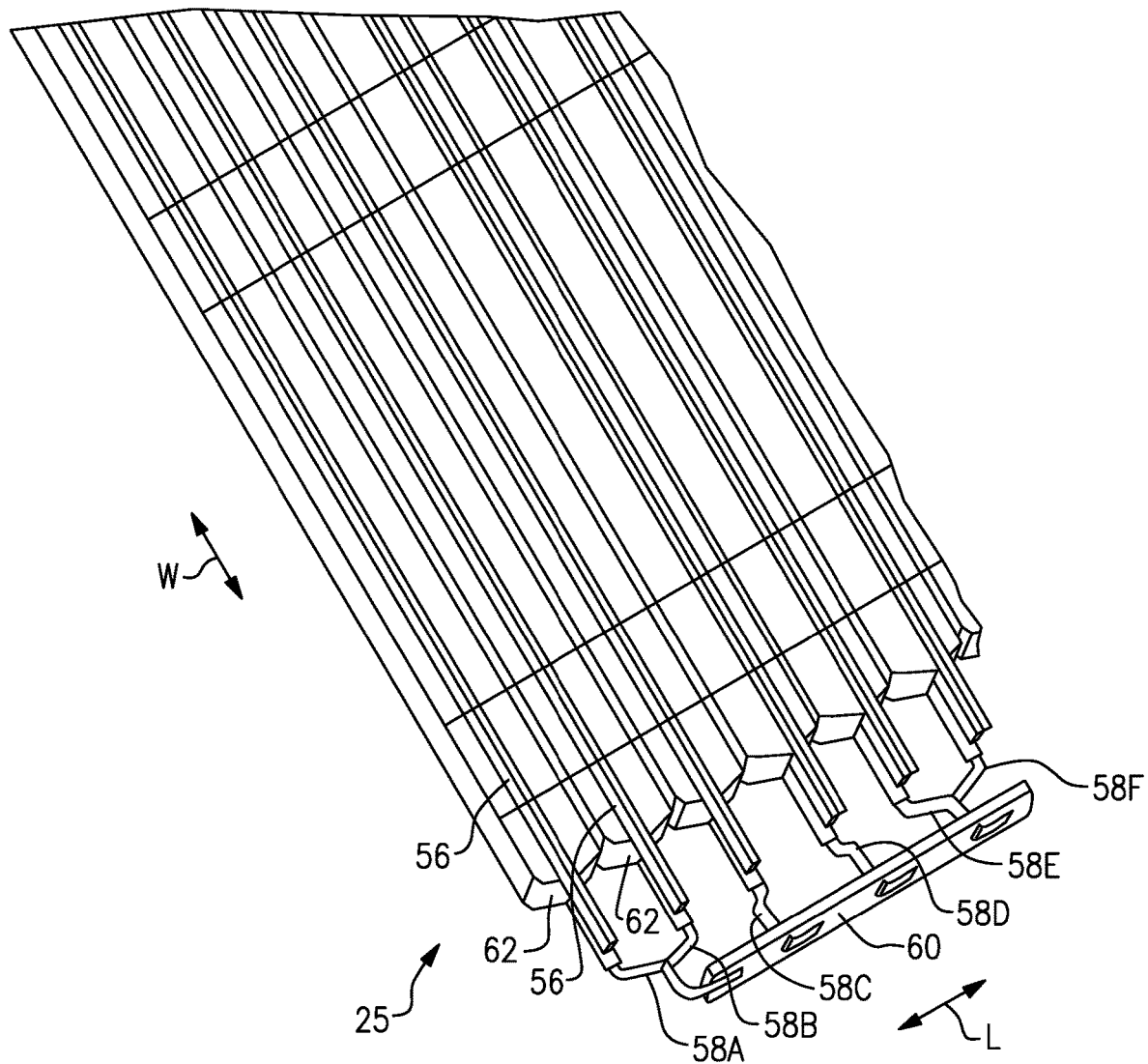
FIG. 3 is a top-perspective view illustrating an example arrangement between the terminals from a plurality battery cells and a busbar.

FIG. 3 illustrates an example arrangement between terminals 58A-58F and a busbar 60. In general, the terminals 58A-58F project in a direction of the width W from the remainder of the battery cell 56 and are configured to be secured to a busbar 60. Specifically, the terminals 58A-58F extend outwardly, in a direction parallel to the width W, from a side surface 62 of each battery cell 56.

While only one terminal 58A-58F is shown relative to each battery cell 56 in FIG. 3, it should be understood that the opposite side of the battery cells 56 are configured similarly, including another terminal projecting in a direction of the width W for engagement with another busbar. In particular, each battery cell 56 includes a positive terminal projecting from one side thereof, and a negative terminal projecting from an opposite side. Adjacent battery cells 56 may be arranged such that each terminal is disposed adjacent to a terminal of an adjacent battery cell that has an opposite polarity. The battery cells 56 may be arranged in another manner, including being arranged such that each terminal is disposed adjacent to a terminal of a like polarity.

The battery assembly 25 may additionally include a plurality of busbars 60 for electrically connecting battery cells 56 of the battery assembly 25. Five example busbars 60 are shown in FIG. 2, and one is shown in FIG. 3. This disclosure is not limited to battery assemblies having any particular number of busbars.

Each busbar 60 may be used to connect to the positive terminals of a plurality of the battery cells 56 to negative terminals of an adjacent group of battery cells 56. In an embodiment, the terminals 58A-58F are made of a first material and the busbars 60 are made of a second, different material. For example, the terminals 58A-58F may be copper terminals and the busbars 60 may be aluminum busbars, or vice versa. Other materials are also contemplated within the scope of this disclosure.

Figure 4:
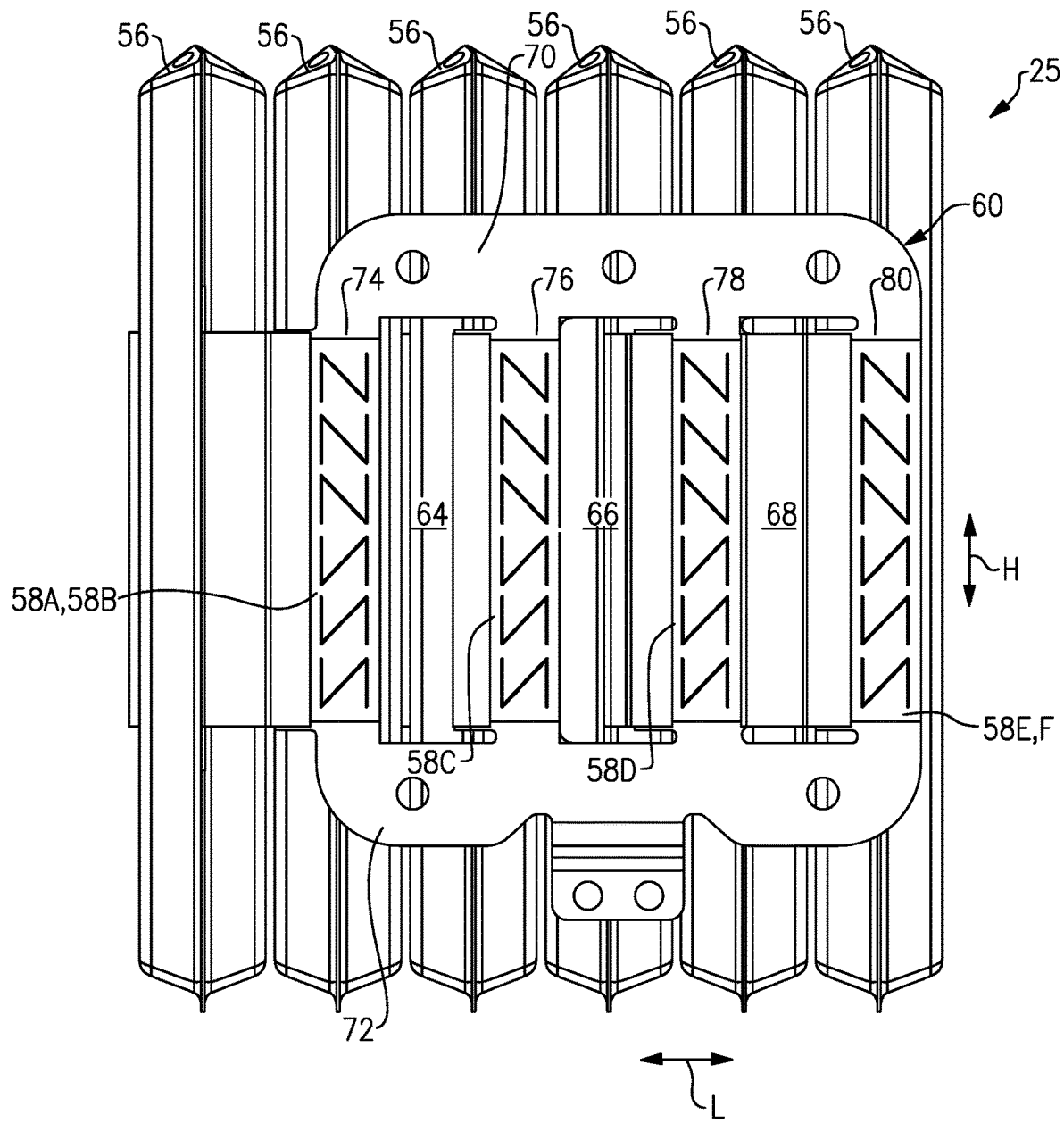
FIG. 4 is a side view illustrating the example arrangement of FIG. 3.

FIG. 4 illustrates the detail of an example arrangement between a busbar 60 and a plurality of the terminals 58A-58F. In FIG. 4, the busbar 60 is substantially rectangular in shape, and includes three cutouts 64, 66, 68. The cutouts 64, 66, 68 provide the busbar 60 with two horizontal sections 70, 72 extending substantially parallel to the length L and spaced-apart from one another in the direction of the height H by four vertical sections 74, 76, 78, 80. In this disclosure, the four vertical sections 74, 76, 78, 80 may each be connected to at least one of the terminals 58A-58F. The terms "horizontal" and "vertical" are used relative to the orientation of the battery assembly 25 in FIG. 4, and are not meant to be otherwise limiting.

With reference to FIGS. 3 and 4, the terminals 58A-58F may be arranged relative to the vertical sections 74, 76, 78, 80 for connection to the busbar 60. Specifically, the terminals 58A-58F may be arranged relative to the vertical sections 74, 76, 78, 80 to facilitate formation of a joint by welding.

In this example, terminals 58A, 58B project around a side (i.e., the left-hand side, relative to FIG. 4) of the busbar 60 and are folded over the vertical section 74. Continuing with the example, terminal 58C projects through the cutout 64 and is folded over the vertical section 76, terminal 58D projects through the cutout 66 and is folded over the vertical section 78, and terminals 58E, 58F project through the cutout 68 and are folded over the vertical section 80. While FIG. 4 only shows one of the busbars 60 in detail, it should be understood that the remaining busbars 60 of the battery assembly 25 are configured similarly.

Further, while two terminals (i.e., 58A, 58B and 58E, 58F) are folded over the vertical sections 74, 80, and while only one terminal (i.e., 58C and 58D) is folded over the vertical sections 76, 78, it should be understood that the terminals 58A-58F could be arranged differently relative to the busbar 60. In this respect, this disclosure extends to other arrangements between the terminals 58A-58F and the busbar 60.

The busbars 60 may be secured to the terminals 58A-58F using a weld pattern having one or more weld beads. In an embodiment, the terminals 58A-58F are laser welded to the busbars 60. As one would appreciate, the laser welding process is sufficient to secure multiple terminals (i.e., terminals 58A, 58B and 58E, 58F) to the busbar 60. This disclosure is not limited to laser welding, and other welding operations are also contemplated within the scope of this disclosure.

FIGS. 5, 6, and 7 illustrate three exemplary weld patterns for securing terminals to a busbar. Each of the three exemplary weld patterns includes at least one substantially Z-shaped weld bead. In a particular embodiment, the weld patterns each include a plurality of spaced-apart Z-shaped weld beads.

In this disclosure, the terms "Z-shaped" and "substantially Z-shaped" are used to refer to shapes that approximate the letter Z, with two parallel legs and a diagonal leg connecting the two parallel legs, as will be discussed below. The term "Z-shaped" includes shapes that resemble a backwards Z or an upside down Z, for example. Relative to FIG. 5, weld bead 84A resembles a backwards Z, while weld bead 84D, for example, resembles a traditional, forward Z-shape. Each of these shapes is "Z-shaped" for purposes of this disclosure.

FIG. 5 illustrates a first example weld pattern 82, which in this example includes a plurality of weld beads 84A-84F. In particular, FIG. 5 is representative of an example weld pattern 82 between the terminals 58A, 58B and the vertical section 74 of the busbar 60. However, the weld pattern 82 may be used in other sections of the battery assembly 25, including between the terminals 58C, 58D, 58E, 58F and the vertical sections 76, 78, 80 of the busbar 60.

The weld beads 84A-84F are spaced-apart from one another. In this example, the weld beads 84A-84F are spaced-apart relative to the height H of the battery assembly 25. Spacing the weld beads 84A-84F as opposed to forming a single, continuous weld bead localizes defects, as defects are less likely to propagate between separate, spaced-apart weld beads. Further, while six weld beads 84A-84F are illustrated in FIG. 5, it should be understood that the weld pattern 82 may include one or more weld beads.

As mentioned, each of the plurality of weld beads 84A-84F is substantially Z-shaped. In particular, with reference to the weld bead 84A, the weld bead 84A includes a first leg 86 and a second leg 88, which are substantially parallel to one another. As shown, the first and second legs 86, 88 extend substantially parallel to the height H and are spaced-apart from one another in the direction of the length L. While reference is made to the height H and length L, it should be understood that this coordinate scheme is referenced only for purposes of discussion and is not intended to limit the weld pattern 82 to a particular location or orientations within a vehicle.

The first and second legs 86, 88 are connected by a diagonal leg 90. The diagonal leg 90, in this example, is a substantially straight leg that connects one end of the first leg 86 to an opposite end of the second leg 88. The diagonal leg 90 traverses in both the direction of the height H and the direction of the length L between the first and second legs 86, 88. Specifically, the first leg 86 includes a first end 92 and a second end 94, the diagonal leg 90 includes a first end 96 and a second end 98, and the second leg 88 includes a first end 100 and a second end 102. In this arrangement, the first ends 92, 100 and second ends 94, 102 of the first and second legs 86, 88 are substantially aligned with one another relative to the height H. Further, the first end 96 of the diagonal leg 90 is coextensive with the second end 94 of the first leg 86, and the second end 98 of the diagonal leg 90 is coextensive with the first end 100 of the second leg 88.

It should be understood that the remaining weld beads 84B-84F are arranged substantially the same as the weld bead 84A. In this example, however, some of the weld beads 84A-84F are substantially mirror images of one another. In particular, the weld beads 84A-84C resemble backwards Z-shapes, while the weld beads 84D-84F resemble traditional, forwards Z-shapes and are essentially mirror images of the weld beads 84A-84C. That is, the weld beads 84D-84F resemble the weld bead 84A reflected about an axis of reflection R, whish bisects the weld bead 84A in a direction normal to the height H.

This disclosure is not limited to weld patterns having any number of weld beads, and is not limited to weld patterns that have a particular arrangement of reflected weld beads. This disclosure extends to weld patterns having one or more weld beads and having any arrangement of reflected weld beads.

The weld beads 84A-84F may each be formed by an individual, continuous welding operation. That is, the weld bead 84A may begin at the first end 92 of the first leg 86 and a continuous laser welding process may form the weld bead 84A until the weld bead 84A reaches the second end 102 of the second leg 88, at which point the laser welding process is momentarily interrupted. The laser welding process may begin again to form the weld bead 84B, and so on until each of the weld beads 84A-84F are formed. Momentarily interrupting the laser welding process has a number of benefits, including reducing the input heat accumulated during the welding process, which in turn helps reduce weld defects.

FIGS. 6 and 7 illustrate second and third example weld patterns 82', 82", respectively. The weld patterns 82' and 82" are substantially similar to the weld pattern 82 of FIG. 5. Like parts have common reference numerals, except in FIGS. 6 and 7 many reference numerals are appended with either a ' or a ", respectively. Further, as with the weld pattern 82, the weld patterns 82' and 82" are illustrated relative to the terminals 58A, 58B and the vertical section 74, although the weld patterns 82' and 82" could be used in other sections of a battery assembly 25.

With reference to FIG. 6, the weld pattern 82' includes a plurality of substantially Z-shaped weld beads 84A'-84F'. With reference to the weld bead 84A', the weld bead 84A' is similar to the weld bead 84A of FIG. 5 but the first end 92' of the first leg 86' is curved, and the second end 102' of the second leg 88' is curved. Specifically, the first leg 86' includes a main section 104, which is substantially parallel to a main section 106 of the second leg 88'. The first end 92' projects from the main section 104, and projects in a direction toward the second leg 88'. The first end 92' is curved in this example, and follows a radius $R_1$ having an origin $O_1$ between the first end 92' and the diagonal leg 90'. The second end 102' projects in a direction toward the first leg 86' from the main section 106, and is also curved in this example. The second end 102' follows a radius $R_2$ having an origin $O_2$ between the second end 102' and the diagonal leg 90'.

Static and fatigue strength experiments and computer-aided engineering (CAE) simulations have shown that high stress areas may occur at the start and end points of the weld beads. Wrapping the ends 92', 102' of the weld bead 84A' displaces the areas where defects may occur from the areas of the weld bead 84A' that experience high loads. If defects do occur during welding, they are unlikely to affect performance.

Further, in FIG. 6, the transitions between the first and second legs 86', 88' and the diagonal leg 90' are rounded. Specifically, the second end 94' of the first leg 86' and the first end 96' of the diagonal leg 90' are rounded, and the second end 98' of the diagonal leg 90' and the first end 100' of the second leg 88' are rounded. Rounding the transitions between the first and second legs 86', 88' and the diagonal leg 90' reduces stress concentrations within the weld bead 84A'.

Despite the wrapping of the ends 92', 102' and the rounding of the transitions between the first and second legs 86', 88' and the diagonal leg 90', the weld bead 84A' (and the weld beads 84B'-84F') are considered "substantially Z-shaped" for purposes of this disclosure.

The ends 92', 102' and transitions with the diagonal leg 90' need not be rounded in all examples. For instance, FIG. 7 illustrates a third example weld pattern 82" in which the ends 92", 102" project substantially normally from the first and second legs 86", 88", respectively. In particular, the ends 92" and 102" project in the direction of the length L, while the remainder of the first and second legs 86", 88" project in the direction of the height H. The ends 92", 102" still serve to prevent defects from being formed in high load areas, although the wrapped ends 92', 102' may have added benefits of reducing stress concentrations.

The unique weld patterns 82, 82', 82" shown and described herein are designed to improve stress distributions and increase strength of the joints between the terminals 58A-58F and the busbars 60. The weld patterns of this disclosure effectively position the start and end points of each weld bead at lower stress areas of the busbar/terminal joints. The weld patterns optimize stress distributions to render more robust joints that exhibit higher static strengths. The exemplary weld patterns further increase the fatigue life of the joints, thereby improving joint quality.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A battery assembly, comprising:
a battery cell including a terminal;
a busbar; and
a plurality of first weld beads securing the busbar to the terminal, wherein each of the plurality of first weld beads are substantially Z-shaped such that each of the plurality of first weld beads includes a first leg and a second leg substantially parallel to one another and a diagonal leg connecting opposite ends of the first and second legs, and wherein each of the plurality of first weld beads are spaced-apart from one another,
wherein the first leg includes a first end and a second end,
wherein the diagonal leg includes a first end and a second end,
wherein the second leg includes a first end and a second end aligned with the first end and second end of the first leg, respectively,
wherein the first end of the diagonal leg is coextensive with the second end of the first leg,
wherein the second end of the diagonal leg is coextensive with the first end of the second leg,
wherein the first end of the first leg is curved toward the second leg, and
wherein the second end of the second leg is curved toward the first leg.

2. A battery assembly, comprising:
a battery cell including a terminal;
a busbar; and
a plurality of first weld beads securing the busbar to the terminal, wherein each of the plurality of first weld beads are substantially Z-shaped such that each of the plurality of first weld beads includes a first leg and a second leg substantially parallel to one another and a diagonal leg connecting opposite ends of the first and second legs, and wherein each of the plurality of first weld beads are spaced-apart from one another,
wherein the first leg includes a first end and a second end,
wherein the diagonal leg includes a first end and a second end,
wherein the second leg includes a first end and a second end aligned with the first end and second end of the first leg, respectively,
wherein the first end of the diagonal leg is coextensive with the second end of the first leg,
wherein the second end of the diagonal leg is coextensive with the first end of the second leg,
wherein the first end of the first leg projects normally from a remainder of the first leg, and
wherein the second end of the second leg projects normally from a remainder of the second leg.

3. The battery assembly as recited in claim 1, wherein some of the plurality of first weld beads are substantially mirror images of others of the plurality of first weld beads.

4. The battery assembly as recited in claim 1, wherein:
the battery cell is a first battery cell and the terminal is a first terminal,
the busbar is connected to a second terminal of a second battery cell with at least one second weld bead,
the second weld bead is substantially Z-shaped.

5. The battery assembly as recited in claim 4, wherein:
the at least one second weld bead includes a plurality of second weld beads securing the busbar to the second terminal,
each of the plurality of second weld beads are spaced-apart from one another, and
each of the plurality of second weld beads are substantially Z-shaped.

6. The battery assembly as recited in claim 1, wherein the terminal is comprised of a first material and the busbar is comprised of a second, different material.

7. The battery assembly as recited in claim 6, wherein the first material is copper and the second material is aluminum.

8. The battery assembly as recited in claim 1, wherein the terminal is either a positive terminal or a negative terminal.

9. The battery assembly as recited in claim 1, wherein the battery cell is a pouch cell.

10. The battery assembly as recited in claim 9, wherein:
the battery cell is arranged such that the terminal projects from a lateral side of the battery assembly, and
the plurality of first weld beads are spaced-apart from one another in a direction of a height of the battery assembly.

11. A method, comprising:
welding a busbar to a terminal of a battery cell using a weld pattern that includes a plurality of Z-shaped weld beads spaced-apart from one another, wherein each of the Z-shaped weld beads includes a first leg and a second leg substantially parallel to one another and further includes a diagonal leg connecting the opposite ends of the first and second legs, wherein each of the Z-shaped weld beads is configured such that an end of the first leg is curved toward the second leg and an end of the second leg is curved toward the first leg.

12. The method as recited in claim 11, wherein welding the busbar to the terminal includes laser welding the busbar to the terminal.

13. The method as recited in claim 11, wherein the weld pattern includes welding some of the plurality of Z-shaped weld beads as substantially mirror images of others of the plurality of Z-shaped weld beads.

* * * * *